March 27, 1928.
D. TODD
DRIVING BELT
Filed Feb. 19, 1925
1,664,335
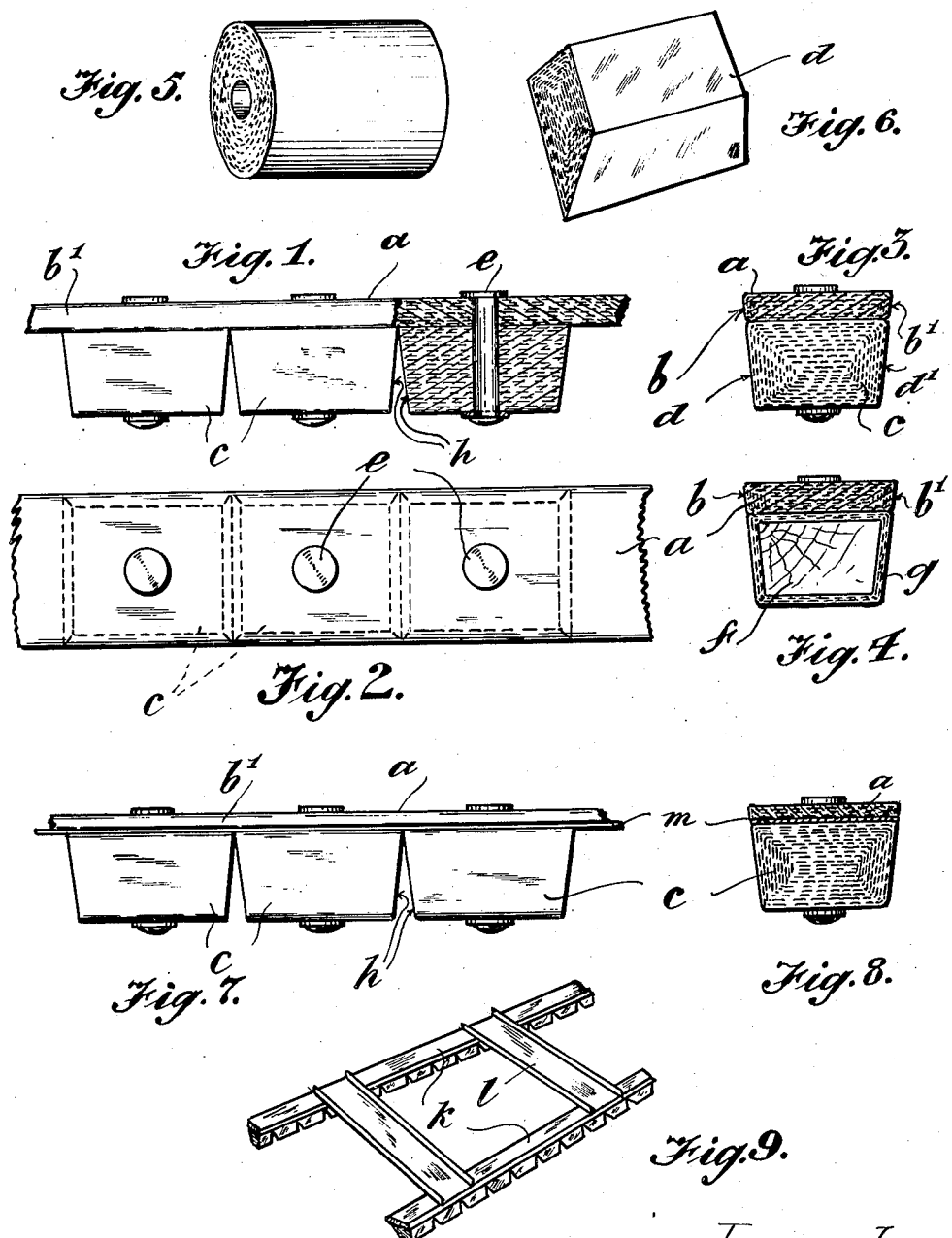

Patented Mar. 27, 1928.

1,664,335

UNITED STATES PATENT OFFICE.

DAVID TODD, OF GLASGOW, SCOTLAND.

DRIVING BELT.

Application filed February 19, 1925, Serial No. 10,234, and in Great Britain March 22, 1924.

This invention has reference to driving belts designed for use with grooved pulleys and relates particularly to that type of belt comprising a flat band having blocks of a pyramidal shape secured on the inner face thereof, the adjacent faces of the blocks forming V-shaped openings so that when traversing a pulley flexibility combined with a large surface for frictional contact is obtained.

Belts of this type as heretofore constructed have been formed of superimposed layers of leather which form the flat band and the blocks secured thereto have likewise been formed of strips of leather.

My invention has for its object to provide a belt of the type set forth which will possess good flexibility, a large surface for frictional contact with the pulley and which will be otherwise entirely satisfactory for both heavy and light machinery.

According to my invention the improved belt comprises a band formed of sheet canvas, or other fabric, impregnated with balata or gutta percha, or like gum or combination thereof, and folded to form a plurality of layers, as is the common practice in the manufacture of such bands, and to which are secured, by rivets, screw nails or the like, a series of blocks of pyramidal or equivalent shape formed of, or covered with, sheet canvas impregnated with balata or gutta percha, or like gum, or combination thereof, the adjacent faces of said blocks forming V-shaped spaces.

By such construction of belt the exposed joints which exist solely between the blocks and the band are reduced to a minimum, there is little danger of any of the blocks becoming detached, and no danger of any part of the blocks coming loose or getting out of alignment to the detriment of the smooth running of the belt.

Under a modified construction I may incorporate a flexible metal band in the belt, preferably between the said band and the blocks.

On the annexed sheet of drawings I have illustrated by way of example preferred embodiments of my invention whereon:—

Figure 1 is a side elevation of a portion of my improved belt, one of the blocks being shown in section.

Figure 2 is a plan view thereof, the dotted lines indicating the blocks.

Figure 3 is an end elevation or section through the belt.

Figure 4 illustrates view corresponding to Figure 3 but showing a modified form of block.

Figures 5 and 6 represent two steps in the manufacture of one form of the said block.

Figures 7 and 8 illustrate a part of a modified construction of belt in side elevation and also section therethrough respectively.

Figure 9 is a perspective view of my improvements as applied to a conveyor.

On the drawings $a$ is a flat band the sides thereof $b$, $b^1$ sloping slightly towards each other as shown. Said band is formed of canvas in combination with a solution of balata or gutta percha impregnated into the canvas. The blocks $c$ are formed of similar material, the sides thereof $d$, $d^1$ sloping towards each other so that they are of a substantially V cross section. Said blocks are conveniently formed from short cylindrical rolls of canvas or other material impregnated with balata or gutta percha. Those rolls, which are illustrated by Figure 5, are put into a mould, or moulds, and pressure applied thereto by hand operated screw presses, hydraulic, or other suitable power. The shape of the mould is such that the rolls assume the shape shown in perspective in Figure 6. These blocks are then secured to the under face of the band, this being conveniently done by means of rivets $e$.

It will be understood, however, that screws, bolts or other suitable means may be employed to secure the blocks to the belt, or the blocks may be secured to the band by balata, gutta percha or like solution in combination with the rivets or bolts.

According to an alternative process of manufacture the blocks may be initially applied to the band $a$ in the form of a continuous band of V or like section and which is secured to the band $a$ by any of the means above set forth. The first mentioned band is then cut transversely to form a series of blocks with inverted V spaces between same.

The blocks may be of wood or other suitable material $f$, Figure 4 and surrounded by canvas or like fabric $g$ impregnated with balata, gutta percha or like material or combination thereof. The angle formed by the adjacent faces $h$ of the blocks is dependent on the diameter of the pulleys or smallest pulley over which the belt is passed and is such that when traversing the pulleys or smallest pulley said faces *h* bear against each other. By so forming the cuts or spaces between the blocks the stress is taken off the rivets, screw nails or bolts when rounding pulleys and therefore the tendency of the blocks to work loose is minimized.

The belt so formed may be made endless by preferably splicing or by any of the usual belt fasteners or by both splicing and fastening.

In use the frictional contact with the pulleys is maintained by the sides of the band *a* and also by the sides of the blocks *c* thereby providing good frictional contact. By reason of the spaces between the blocks the belts are very flexible when rounding pulleys.

The said blocks may be removably secured so as to be readily replaced.

As shown in Figures 7 and 8 I may incorporate a flexible metal band *m*, preferably of steel, between the canvas band *a* and the blocks *c*, or the said metal band may be incorporated in the band *a* or be secured to the outer face thereof. By such construction the thickness of the belt *a* may be reduced with a corresponding increase in flexibility.

In Figure 9 I have illustrated a conveyor comprising two of my improved belts *k* joined at suitable intervals by the cross members, trays or buckets *l* secured thereto by bolts or the like.

What I claim is:—

1. A belt comprising a band formed of sheet fabrics impregnated with a gum and folded to form a plurality of layers, in combination with a series of blocks having an outer surface of fabric impregnated with a gum and secured to said band at intervals throughout the length thereof, the opposed faces of adjacent blocks forming V-shaped spaces and meeting at the apex thereof.

2. A belt comprising a band formed of sheet fabric impregnated with a gum and folded to form a plurality of layers, pyramidal shape blocks on the inner face of said band, rivets extending through the band and blocks, and a fabric impregnated with a gum covering said blocks, the opposed faces of adjacent blocks forming V-shaped spaces and meeting at the apex thereof.

3. A belt comprising a band having angled edges formed of sheet canvas impregnated with balata or gutta percha and folded in form a plurality of layers, in combination with blocks on the inner face of the band providing V openings between the blocks the opposed faces of the adjacent blocks meeting at the apex of the opening, means securing the blocks in position and canvas impregnated, with balata or gutta percha covering said blocks.

4. A belt comprising a band formed of sheet fabric impregnated with a gum and folded to form a plurality of layers in combination with a series of blocks secured on the inner faces thereof, said blocks being formed by a multiplicity of layers of canvas impregnated with a gum, the opposed faces of adjacent blocks forming V-shaped spaces and meeting at the apex thereof.

5. A belt comprising a band formed of sheet fabric impregnated with a gum and folded to form a plurality of layers in combination with a series of blocks of pyramidal shape secured at intervals throughout the length of said band and forming V openings between same, the opposed faces of the adjacent blocks meeting at the apex of the opening, said blocks being formed by fabric impregnated with a gum and folded to form a multiplicity of layers.

6. A belt comprising in combination a band formed of sheet fabric impregnated with a gum and folded to form a plurality of layers, a series of blocks having an outer surface of fabric impregnated with a gum and secured to said band at intervals throughout the length thereof, the opposed faces of adjacent blocks forming V-shaped spaces and meeting at the apex thereof, and a flexible metal band incorporated between said canvas and blocks.

7. A belt comprising a band having angled edges formed of sheet canvas impregnated with balata or gutta percha and folded to form a plurality of layers, in combination with blocks on the inner face of the band providing V openings between the blocks, the opposed faces of the adjacent blocks meeting at the apex of the opening, means for securing the blocks in position, canvas impregnated with balata or gutta percha covering said blocks and a flexible metal band incorporated between the canvas bands and blocks.

8. A belt comprising a band formed of sheet fabric impregnated with a gum and folded to form a plurality of layers in combination with a series of blocks of pyramidal shape secured at intervals throughout the length of said band and forming V openings between same, the opposed faces of the adjacent blocks meeting at the apex of the opening, said blocks being formed by fabric impregnated with a gum and folded to form a multiplicity of layers and a flexible metal band incorporated between the canvas bands and blocks.

DAVID TODD.